United States Patent
January

[19]

[11] Patent Number: 6,134,792
[45] Date of Patent: Oct. 24, 2000

[54] METHOD AND APPARATUS FOR DETERMINING WHEEL ALIGNMENT OPTICAL TARGET ORIENTATION PARAMETERS

[75] Inventor: Daniel B. January, St. Peters, Mo.

[73] Assignee: Hunter Engineering Company, Bridgeton, Mo.

[21] Appl. No.: 09/196,008

[22] Filed: Nov. 19, 1998

[51] Int. Cl.$^7$ .................................................. G01B 11/275
[52] U.S. Cl. .................... 33/203.18; 33/288; 356/155; 356/139.09
[58] Field of Search ................... 33/203.18, 288, 33/337, 336, 203.19, 203.2; 356/155, 3.12, 139.09, 14.3, 39.09

[56] References Cited

U.S. PATENT DOCUMENTS

| | | | |
|---|---|---|---|
| 3,892,042 | 7/1975 | Senften | 33/288 |
| 4,180,915 | 1/1980 | Lill et al. | 33/288 |
| 4,336,658 | 6/1982 | January | 33/288 |
| 5,488,472 | 1/1996 | January | 356/139.09 |
| 5,532,816 | 7/1996 | Spann et al. | 356/139.09 |
| 5,535,522 | 7/1996 | Jackson | 33/288 |
| 5,675,515 | 10/1997 | January | |
| 5,724,128 | 3/1998 | January | 356/139.09 |
| 5,724,743 | 3/1998 | Jackson | 33/288 |
| 5,886,781 | 3/1999 | Muller et al. | 356/139.09 |

*Primary Examiner*—Christopher W. Fulton
*Attorney, Agent, or Firm*—Polster, Lieder, Woodruff & Lucchesi, L.C.

[57] ABSTRACT

An apparatus and method for determining the orientation parameters of a wheel-alignment optical target 10 affixed to a vehicle wheel 20 by a no-compensation wheel clamp 16. The wheel-alignment optical target includes a stub shaft 24 adapted for insertion within an axial bore 18 of the no-compensation wheel clamp after the wheel clamp is secured to the vehicle wheel. An optical imaging system observes the optical target and measures the orientation of the target face in a first position. The optical target is rotated partially about the longitudinal axis of the stub shaft, and the optical target is again observed and the orientation of the target face is again measured by the optical imaging system. By comparing the measured orientations of the optical target at the two rotational positions, a compensation vector $\vec{V}c$ describing the alignment of the target face relative to the stub shaft is be determined and stored for subsequent uses of the optical target.

38 Claims, 9 Drawing Sheets

METHOD AND APPARATUS FOR DETERMINING WHEEL ALIGNMENT OPTICAL TARGET ORIENTATION PARAMETERS

BACKGROUND OF THE INVENTION

The present invention relates to vehicle-wheel alignment measurements, particularly to vehicle-wheel alignment systems which measure the location and orientation of each vehicle wheel in a three dimensional coordinate system utilizing an optical target held on a no-compensation wheel adapter clamp affixed to the vehicle wheel, and more particularly, to an apparatus and method for calibrating the relationship between the optical target and a shaft upon which the optical target is mounted, and for using the calibrated relationship in vehicle wheel alignments.

U.S. Pat. Nos. 5,535,522 and 5,724,743 to Jackson each describe the use of video cameras having one or more defined fields of view to observe optical targets of known configurations mounted to individual vehicle wheels. Through the use of sophisticated image recognition methods, the three dimensional coordinates and orientations of the vehicle wheels and their corresponding axes of rotation are determined. The wheel alignment parameters are determined from these coordinates and orientations.

The relationship between an alignment sensor which is mounted to a vehicle and the axis of rotation of an associated wheel is generally not deterministic, at least not to the level of accuracy required for wheel alignment measurements. The vehicle wheels usually have some amount of runout, which prevents the outer edge of a wheel rim from being representative of a plane normal to the axis of rotation. In addition, the wheel adapter clamps used to mount the alignment sensors to the wheels are usually not manufactured to such tight tolerances so as to guarantee a deterministic relationship between the mounting of the sensor to the clamp and the mounting of the clamp to the wheel.

Accordingly, conventional alignment measurement procedures involve "compensating for runout", which is described, for example, in U.S. Patent No. 3,892,042 to Senften. Certain automobile manufacturers have developed systems to eliminate the need for runout compensation involving specially designed wheels and wheel clamps. Some provide holes in the wheels which allow elongated pins on the clamp to pass through the wheel and press against the surface of the brake disc. Since the disk is presumed to have a surface which is normal to the axis of rotation of the wheel, the mounting of the clamp to the wheel and thus the axis of rotation is controlled. Other methods provide wheels having machined outer surfaces with very tight tolerances and clamps which press against those surfaces, thereby controlling the orientation of the wheel clamp relative to the axis of rotation of the wheel. Clamps for use with such wheels are termed "no-compensation" wheel adapter clamps, as a sensor can be mounted to a wheel in a deterministic manner such that the conventional runout compensation procedure is not necessary.

The disclosures of U.S. Pat. Nos. 5,535,522 and 5,724,743 each discuss determining the relationship between the alignment targets and the corresponding axes of rotation for the wheels each time the alignment targets are mounted to the wheels, but they do not provide for determining the relationships between the targets and the corresponding wheel adapter clamps.

The present invention provides a method for determining the relationship between each alignment target and the mount, for example a stub shaft, by which that target is mounted to a no-compensation wheel adapter clamp. This relationship is stored for subsequent use. Each time a target is mounted to a no-compensation wheel adapter clamp, the relationship for that particular alignment target is applied, and the conventional runout compensation procedure is avoided.

This has several benefits. First, the alignment measurement procedure is faster, as the time normally required to perform the runout compensation procedure is several minutes at best. Second, the vehicle does not have to be jacked up to allow the wheels to rotate, thereby preventing the resulting hysteresis effects from affecting the alignment measurements.

BRIEF SUMMARY OF THE INVENTION

Among the several objects and advantages of the present invention are:

The provision of an apparatus method for determining the orientation parameters of a wheel-alignment optical target relative to a mounting element;

The provision of the aforementioned apparatus wherein the optical target is mounted on a shaft configured for connection to a no-compensation wheel clamp secured to a vehicle wheel;

The provision of the aforementioned apparatus wherein the shaft is adapted to be inserted within an axial bore through a vehicle wheel clamp adapter, the axial bore approximately being aligned with the axis of rotation for the vehicle wheel;

The provision of the aforementioned apparatus wherein the optical target is adapted for rotation about the longitudinal axis of the stub shaft;

The provision of the aforementioned apparatus wherein the optical target may be secured in a fixed position relative to the longitudinal axis of the stub shaft;

The provision of the aforementioned method wherein the stub shaft is insertable within the axial bore of the no-compensation clamp, such that the three-dimensional parameters of the optical target in a first position may be observed and recorded by an optical imaging system;

The provision of the aforementioned method where the optical target is rotatable partially about the longitudinal axis of the shaft such that the three-dimensional parameters of the optical target may again be observed and recorded by the optical imaging system;

The provision of the aforementioned method wherein two sets of three-dimensional parameters, transferred to an associated computer, may be utilized to determine the relationship between the optical target and the longitudinal axis of the shaft, the relationship being recorded and associated with the optical target for future use;

The provision of the aforementioned apparatus and method wherein the alignment parameters of an optical target, once determined, are stored in association with the optical target for use in determining a relationship between the optical target and a vehicle wheel rotational axis when the optical target is employed in a vehicle wheel alignment system; and The provision of the aforementioned apparatus and method wherein optical targets for vehicle wheel alignment may be quickly and easily adapted for accurate use with no-compensation wheel clamps through a single calibration procedure.

Briefly stated, the method of the present invention calibrates a wheel-alignment optical target by determining the orientation parameters of the optical target relative to a mounting shaft for use when the optical target is affixed to a vehicle wheel by a no-compensation wheel clamp. The wheel-alignment optical target includes a mounting shaft adapted for insertion within an axial bore of the no-compensation wheel clamp, after the wheel clamp is secured to the vehicle wheel. The relationship between the longitudinal axis of the mounting shaft and the face of the optical target is determined by an optical imaging system which observes and records the position and orientation (pitch, yaw, and roll) of the target in a first orientation. The optical target is then rotated within the axial bore of the no-compensation wheel clamp, partially about the longitudinal axis of the mounting shaft, altering the position and orientation of the optical target without affecting the orientation of the axis of rotation. The optical target is again observed by the optical imaging system, and the altered position and orientation recorded. From the two recorded target orientations, the orientation of the axis about which the target was rotated is determined relative to the optical target in the target coordinate system using mathematical transforms to define a compensation vector describing the relationship between the rotational axis and the target. Utilizing the compensation vector with subsequent position and orientation parameters of the optical target obtained during use, the alignment of the axis of rotation for the vehicle wheel relative to the optical target for each use of the optical target may be readily determined.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what we presently believe is the best mode of carrying out the invention.

It is preferred that portions of the present invention be embodied in a computer controlled vehicle wheel alignment system, as is usual and customary in the art. Most modern wheel alignment systems are built using an off-the-shelf IBM-compatible personal computer (PC) which is connected to the requisite alignment sensors through built-in serial ports or through custom designed hardware.

As will be discussed presently, the sensors utilized with the present invention consist of one or more optical cameras which are adapted to view optical targets, preferably mounted to vehicle wheels and similar to those described in detail in the disclosures of U.S. Pat. No. 5,676,515 to January, herein incorporated by reference.

Figure 1:
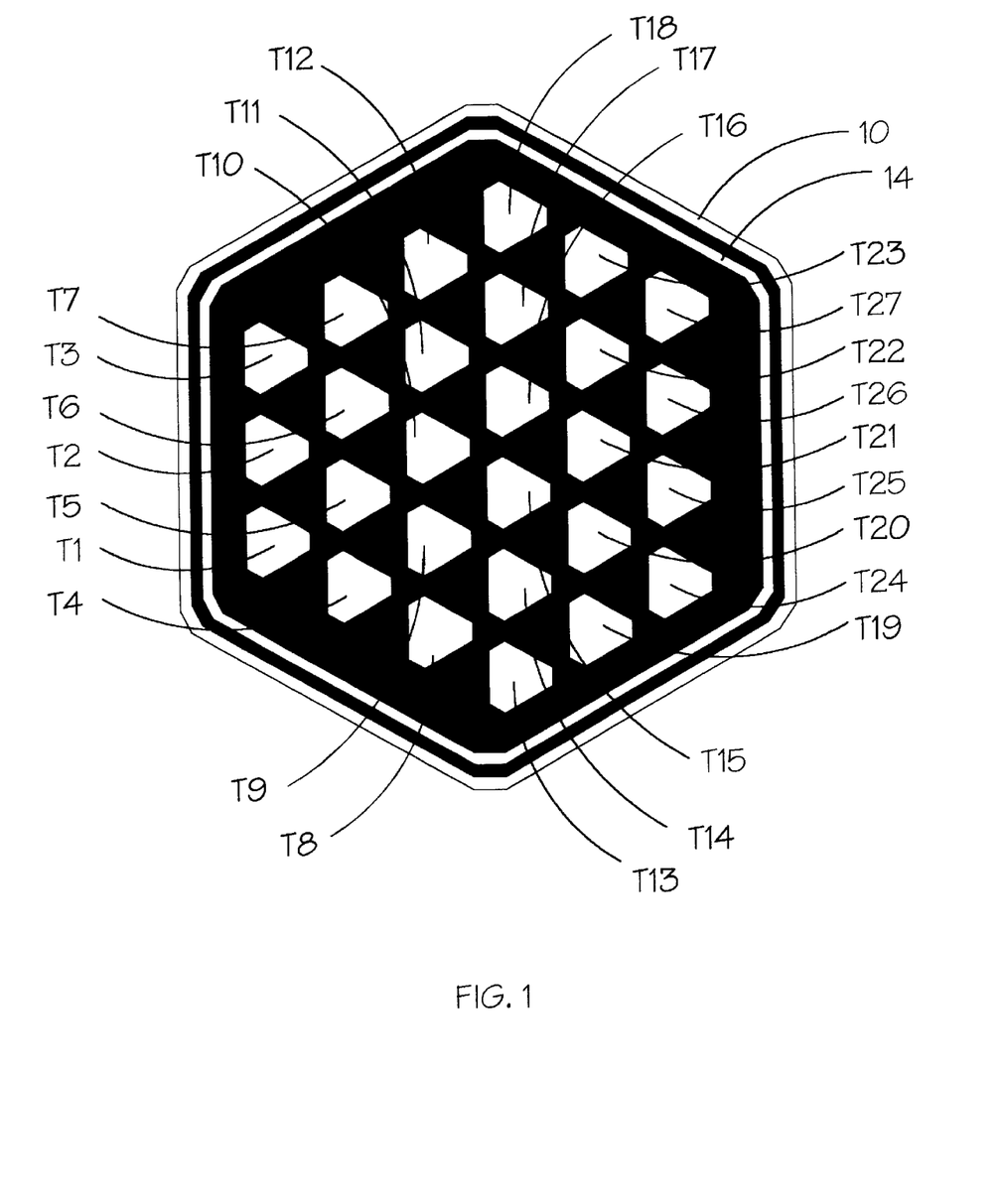
FIG. 1 is a front view of an optical target to be attached to a vehicle wheel, the target adapted for viewing by a video camera for determining wheel alignment parameters.
Figure 2:
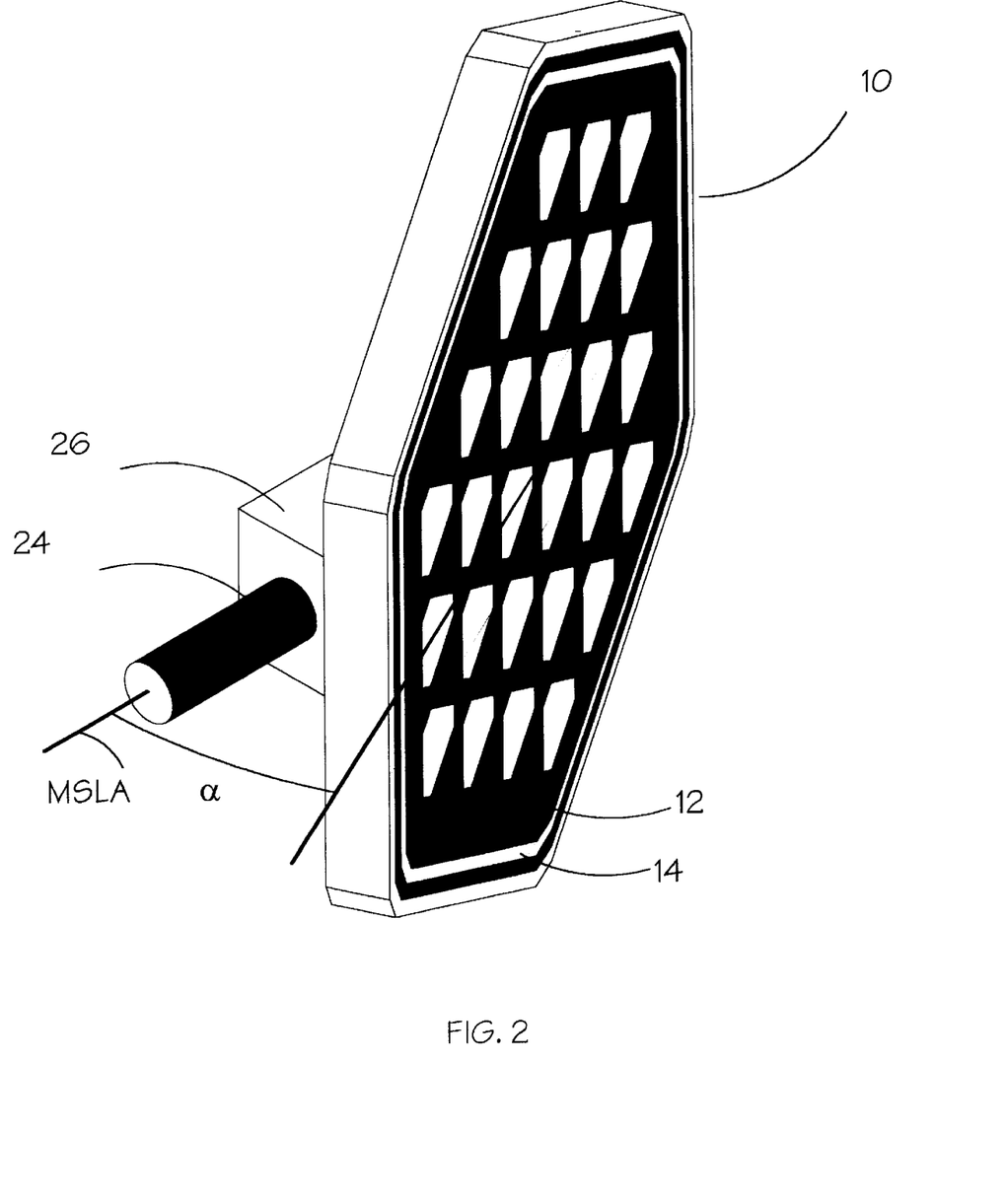
FIG. 2 is a perspective view of the optical target of FIG. 1, illustrating the optical target mounting element.

Turning now to FIGS. 1 and 2, an optical target 10 is shown having a target face 12 upon which various target indicia T1–T27 are shown, surrounded by a peripheral border 14. Although the target face 12 is shown as a hexagonal design incorporating truncated triangular target indicia T1–T27, those skilled in the art will readily recognize that the apparatus and method described herein may be utilized to determine the orientation parameters for numerous optical target configurations. The invention does not require any particular type, shape, configuration, or appearance of the optical target 10.

Figure 3:
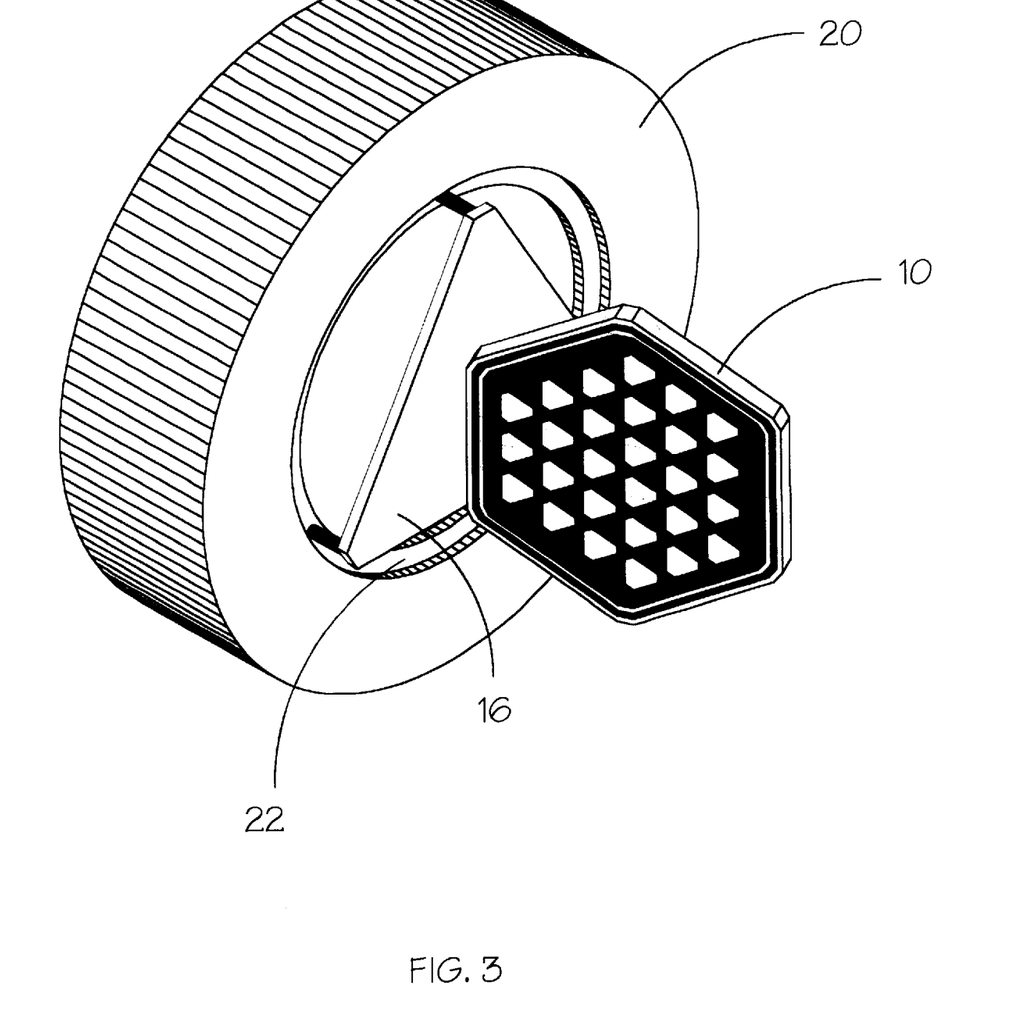
FIG. 3 is a perspective view of the optical target, a wheel clamp, and vehicle wheel, illustrating the attachments therebetween.
Figure 4:
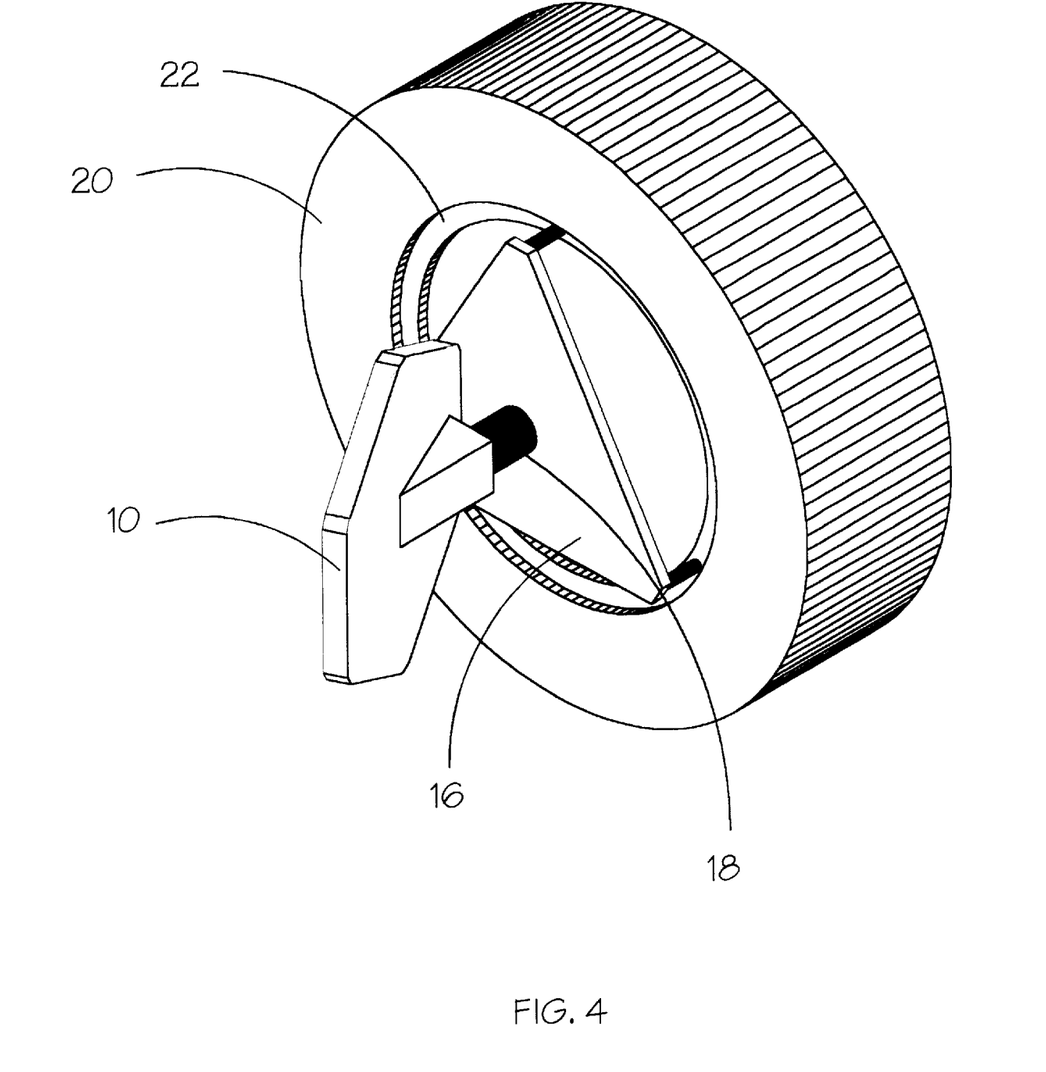
FIG. 4 is a view similar to FIG. 3, wherein the optical target, the wheel clamp, and vehicle wheel are shown from a second perspective viewpoint.
Figure 5:
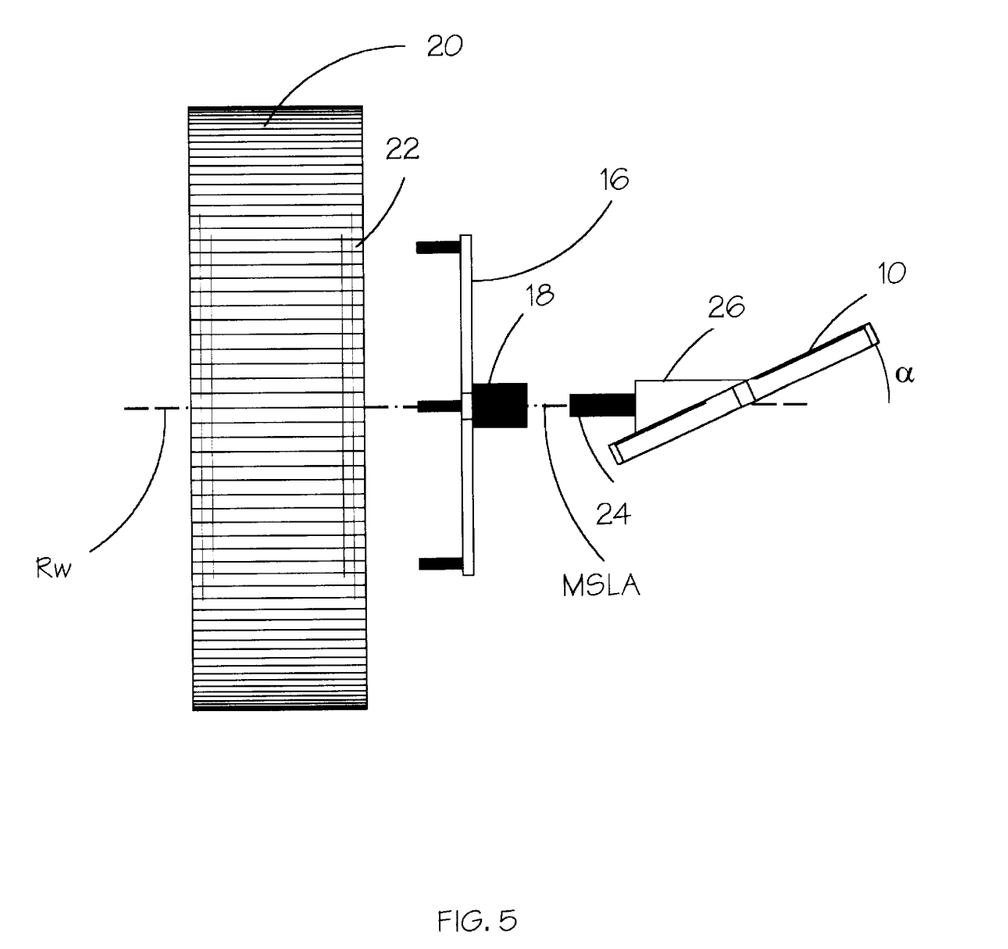
FIG. 5 is a top plan view of the optical target, the wheel clamp, and the vehicle wheel, illustrating the axial alignment of the components.

As shown in FIGS. 3 and 4, the optical target 10 is adapted for use with a no-compensation wheel adapter clamp 16 having an axial bore 18 or similar attachment point. When mounted on a vehicle wheel 20 by attachment to a wheel face 22, the no-compensation wheel adapter clamp 16 is aligned such that a longitudinal axis of the axial bore 18 or similar attachment point is closely parallel to the axis of rotation Rw of the vehicle wheel 20 as shown in FIG. 5. A mounting shaft 24, affixed to the rear of the optical target 10, at an angle $\alpha$ to the target face 12, is configured for insertion within the axial bore 18. In the preferred embodiment, the mounting shaft 24 is a cylindrical stub-shaft configured for insertion within the axial bore 18, however, one skilled in the art will recognize that numerous other mounting means such as bolts or bearings permitting rotation of the optical target to a variety of orientations about the longitudinal axis of the axial bore 18 or attachment point may be employed.

As best seen in FIG. 2, the mounting shaft 24 is secured to the optical target 10 by a housing 26 with a predetermined angle a between the target face 12 and the mounting shaft longitudinal axis MSLA. During the manufacture of the housing 26, and the attachment of the target face 12 and mounting shaft 24 thereto, slight variations in the angular relationships between the components may develop, resulting in the mounting shaft longitudinal axis MSLA being misaligned by a small amount from the predetermined angle $\alpha$. While these variations from the desired configuration may or may not be observable to a casual human observer, they are usually significant enough to produce an axial misalignment of the target face 12 during rotations which affects the outcome of a precision optical alignment process utilizing the optical target 10. In general, the orientation of the target face 12 to the mounting shaft 24 need not be precise, as an object of the present invention is to measure that orientation precisely and save it for later re-use.

Figure 8A:
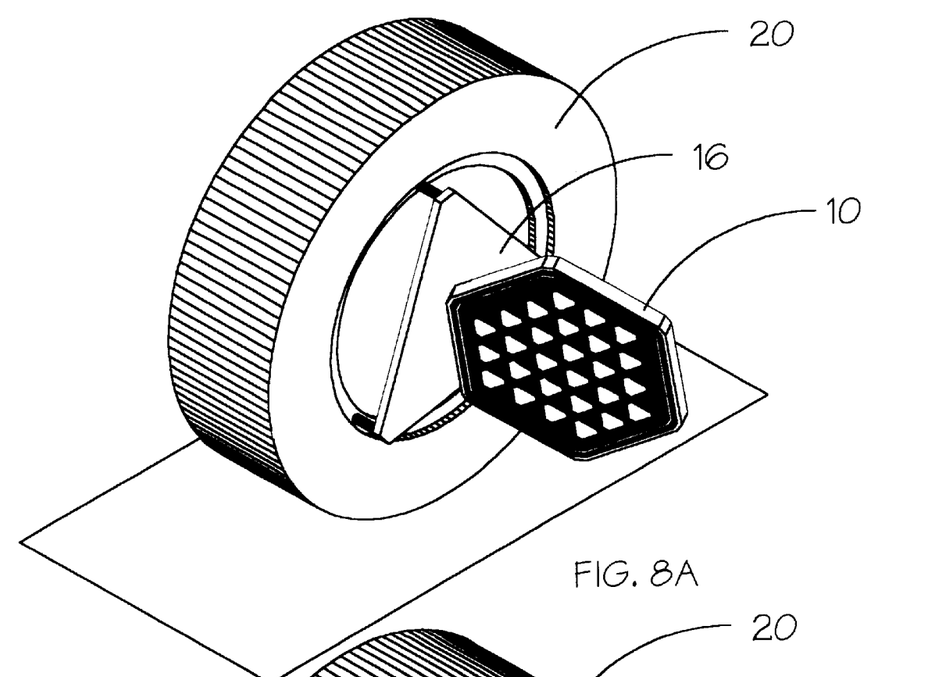
FIG. 8A is a perspective illustration of an optical target secured to a vehicle wheel at a first orientation.
Figure 8B:
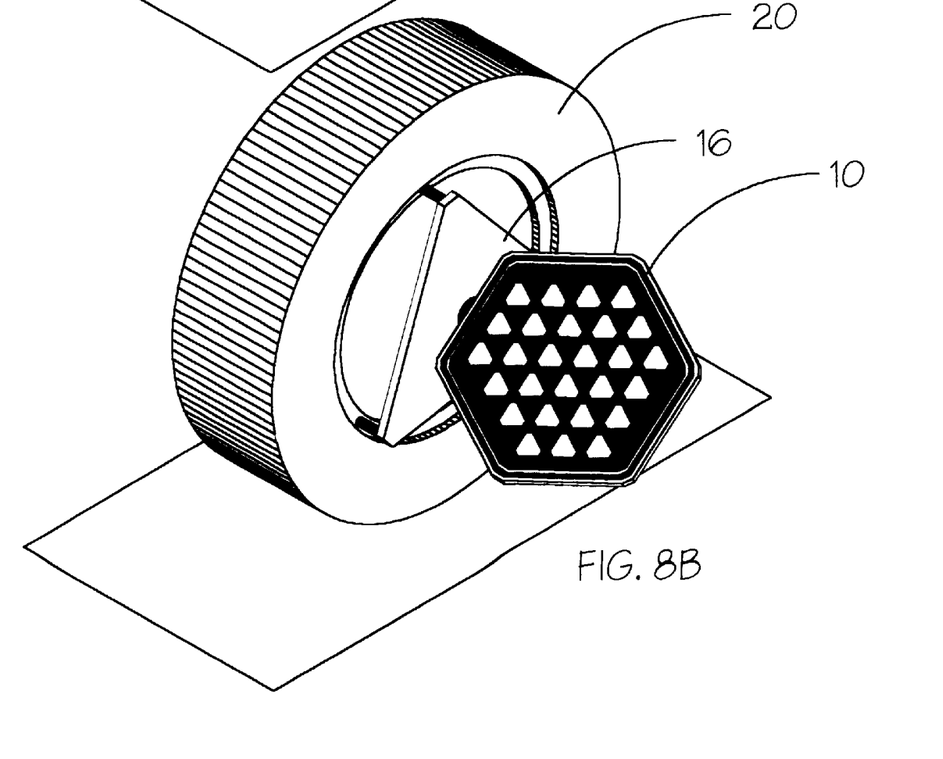
FIG. 8B is a perspective illustration similar to FIG. 8a, illustrating the effect rotation of the optical target.

Accordingly, it is necessary to calibrate the alignment of the optical target 10 prior to use, compensating for any known or unknown manufacturing misalignments. To determine the relationship between an axis of rotation for a vehicle wheel Rw, the longitudinal axis of the mounting shaft MSLA, and the face 12 of the optical target, an optical imaging system (not shown) observes an image of the target face 12 when it is mounted at a first orientation, preferably on the vehicle wheel 20 by insertion of the mounting shaft 24 in the axial bore 18 of the no-compensation wheel clamp 16 as shown at FIGS. 3 and 8A. The optical target 10 is next rotationally reoriented about the mounting shaft longitudinal axis MSLA to a second orientation, FIG. 8B, approximately sixty degrees displaced from the first orientation, and a second image of the target face 12 is again observed by the optical imaging system at a second orientation. One skilled in the art will recognize that the actual rotational reorientation of the optical target 10 need not be a smooth or continuous rotation, and, for example, may involve the steps of detaching the optical target from the axial bore 18 or attachment point, rotating the optical target in a stepwise manner, followed by remounting in the axial bore 18 or attachment point, the net rotation thereby defining the axis about which the optical target was rotated.

Figure 7A:
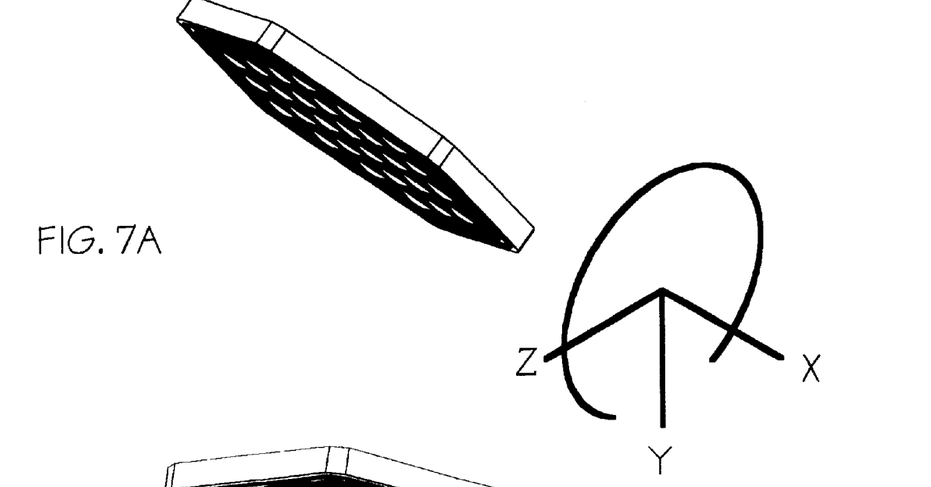
FIG. 7A is a perspective illustration of an optical target face, illustrating pitch rotation.
Figures 7B, 7C:
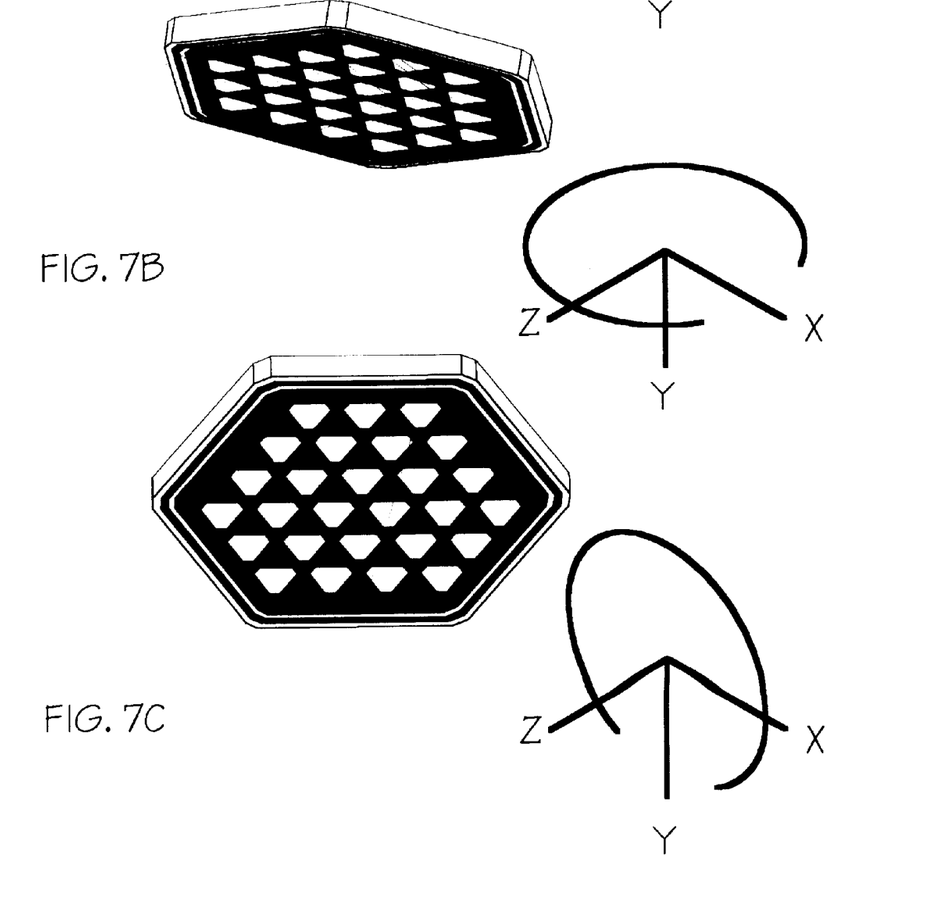
FIG. 7B is a perspective illustration of an optical target face, illustrating yaw rotation.
FIG. 7c is a perspective illustration of an optical target face, illustrating roll rotation.
Figure 9:
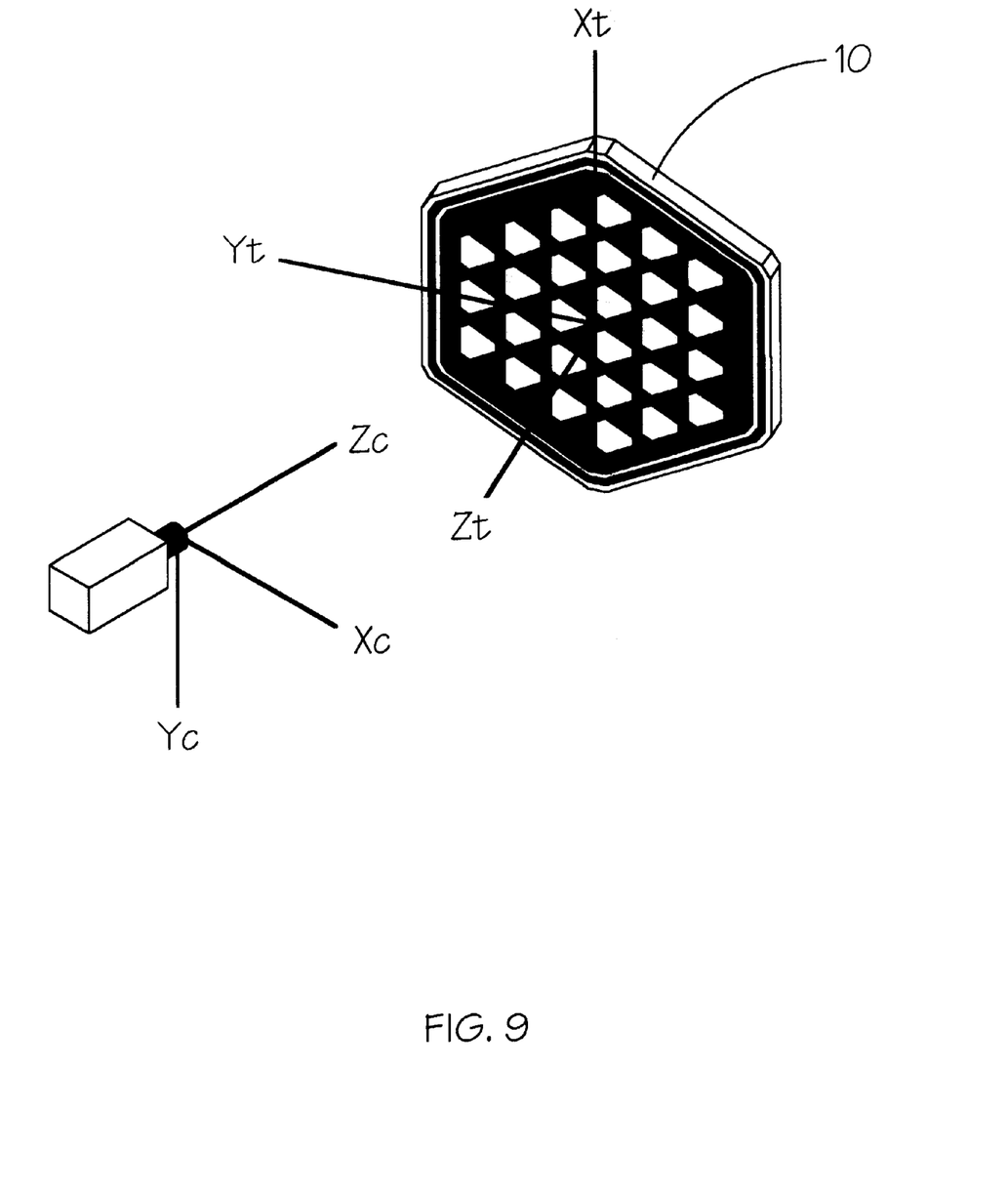
FIG. 9 is a perspective view of an optical target face and an optical imaging system configured to view the optical target face, illustrating the associated coordinate systems.

Each observation of the optical target face 12 yields a separate set of three-dimensional parameters ($Rx_1$, $Ry_1$, $Rz_1$, and $Rx_2$, $Ry_2$, $Rz_2$, respectively), which describe the orientation of the target face 12 as a set of three rotations about the three corresponding axes of a three-dimensional coordinate system defined relative to the optical imaging system axis $X_c$, $Y_c$, and $Z_c$, rather than the target coordinate system axis $X_1$, $Y_1$, and $Z_1$, as shown in FIG. 9. Conventionally, this orientation is described as pitch, followed by yaw, followed by roll, which are illustrated at FIGS. 7A, 7B, and 7c respectively. More precisely, Rx describes rotation of the optical target 10 about the $X_c$-axis of the imaging coordinate system (FIG. 7A), Ry describes rotation of the optical target 10 about the $Y_c$-axis of the imaging coordinate system (FIG. 7B), and Rz describes rotation of the optical target 10 about the $Z_c$-axis of the imaging coordinate system (FIG. 7c).

Due to the axial misalignment caused by the combination of the predetermined angular alignment $\alpha$ and any manufacturing misalignment present, the plane defined by the target-face 12 conically rotates about the mounting shaft longitudinal axis MSLA when the optical target 10 is reoriented. By comparing the target face 12 as observed at each of the two positions and orientations, the orientation of the mounting shaft longitudinal axis MSLA relative to target face 12 may be determined by mathematical matrix manipulations or coordinate transforms and recorded as a set of alignment parameters or a compensation vector $\vec{V}c$. The compensation vector $\vec{V}c$ is a vector, preferably a unit vector, describing the orientation of the rotational axis about which the optical target was reoriented in the optical target coordinate system.

Once determined, the alignment parameters or compensation vector $\vec{V}c$ is utilized to determine the alignment of the mounting shaft longitudinal axis MSLA, which is substantially identical to the axis of rotation Rw of the vehicle wheel 20, relative to the target face 12 for each subsequent use of the specific optical target 10 for which it is calculated. If necessary, an occasional re-calibration of the compensation vector $\vec{V}c$ may be performed to maintain the desired level of accuracy as the optical target suffers wear and tear associated with normal usage.

While the preferred method for calibration of the optical target 10 described above utilizes the axial bore of a no-compensation wheel adapter clamp, one skilled in the art will further recognize that the calibration of the optical target results in the compensation vector $\vec{V}c$ which describes the relationship between the axis MSLA and the target face 12, not the wheel face or wheel axis of rotation Rw, and hence may be carried out with the mounting shaft 24 of the optical target 10 seated in any axial bore or attachment point within the view of an optical imaging system.

In the preferred embodiment described above, since each optical target 10 manufactured will vary slightly due to inherent imprecision in the manufacturing techniques, the compensation vector $\vec{V}c$ is initially determined and recorded for each optical target 10, prior to the first use of the optical target. Those skilled in the art will recognize that any number of means may be utilized to associate a determined compensation vector $\vec{V}c$ with a specific optical target 10. For example, the compensation vector $\vec{V}c$ may be stored in a database and indexed by a target serial number unique to each optical target, or it may be printed in numerical, bar-code, or similar format on a sticker and secured to the backside of the optical target 10 prior to shipment from the manufacturing facility. In the alternative, through the use of higher cost, precision manufacturing techniques, it is considered within the scope of this invention to manufacture one or more identical optical targets 10 to specific tolerances, such that each optical target 10 has an identical compensation vector $\vec{V}c$ which may be determined from the calibration of an optical target 10 selected at random from the batch or by manufacturing to predetermined optical target specifications resulting in a predetermined compensation vector $\vec{V}c$.

Figure 6:
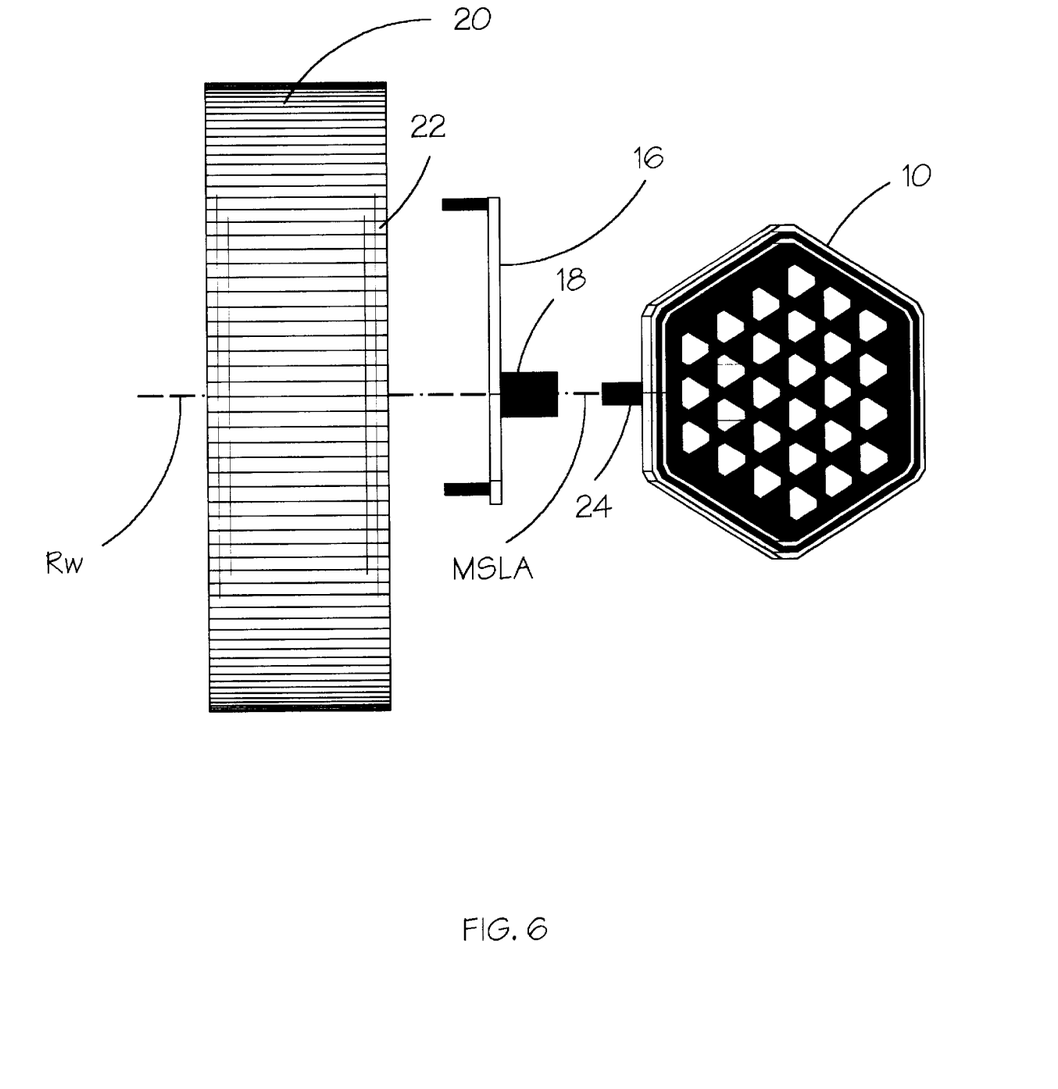
FIG. 6 is a front plan view of the optical target, the wheel clamp, and the vehicle wheel shown in FIG. 5.

Once the alignment parameters or compensation vector $\vec{V}c$ has been determined and or stored in association with each individual optical target 10, the alignment parameters or compensation vector $\vec{V}c$ may be recalled and utilized as needed during a vehicle wheel alignment procedure. In the preferred embodiment, an optical target is utilized by mounting on a no-compensation wheel adapter clamp 16 such that the mounting shaft 24 of the optical target is seated within the axial bore 18 or similar attachment point on the clamp 16. If the wheel adapter clamp 16 is not already secured to a vehicle wheel 20, the clamp 16 is clamped thereto such that the axial bore 18 is aligned substantially parallel to the axis of rotation Rw of the vehicle wheel 20, as best seen in FIGS. 5 and 6. At least one image of the optical target face 12 is then made by the optical imaging system, and the orientation of the optical target face 12 in three dimension is calculated. The vehicle wheel alignment system applies the recalled compensation vector $\vec{V}c$ to the measured orientation of the optical target face 12 to determine the orientation in three dimension of the mounting shaft 24. Since the mounting shaft 24 is substantially parallel to the vehicle wheel rotational axis Rw, the vehicle wheel axis has substantially the same orientation as the mounting shaft. The recalled alignment parameters or compensation vector $\vec{V}c$ provide the system with information relating the calculated orientation to the longitudinal axis of the target mounting shaft. Accordingly, the use of the recalled alignment parameters or compensation vector $\vec{V}c$ provides the vehicle wheel alignment system with a relationship between the observed target face orientation and the vehicle wheel rotational axis Rw.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. In a system utilizing an observable optical target having a mounting means with a rotational axis and an optical camera configured to observe said optical target for determining the orientation thereof, a method for determining the alignment of said optical target relative to said rotational axis of said mounting means, comprising the steps of:

observing said optical target in at least two rotational positions about said rotational axis with said optical camera;

determining an orientation of said optical target at each of said rotational positions;

determining the alignment of said optical target relative to said rotational axis utilizing said determined orientations.

2. The alignment determining method of claim 1 wherein said optical target is releasably secured in said rotational positions.

3. The alignment determining method of claim I wherein rotation of said optical target about said rotational axis between said rotational positions comprises rotation through an angle of approximately sixty degrees.

4. The alignment determining method of claim 1 farther including the step of storing said determined alignment in association with said optical target for later use.

5. The alignment determining method of claim 4 wherein storing said determined alignment in association with said optical target for later use comprises recording said alignment on said optical target.

6. The alignment determining method of claim 4 wherein storing said determined alignment in association with said optical target for later use comprises recording said alignment in a database.

7. A method for using said stored alignment of claim 4 comprising:

mounting said optical target on a wheel clamp attached to a vehicle wheel and configured to receive said mounting means such that said rotational axis of said mounting means is aligned substantially parallel to the axis of rotation of said vehicle wheel;

observing said optical target at a rotational position about said rotational axis of said mounting means;

recalling said stored determined alignment associated with said optical target; and determining the orientation of said rotational axis of said vehicle wheel utilizing at least said observation of said optical target and said recalled determined alignment.

8. The alignment determining method of claim 1 wherein a face of said optical target is observed at said rotational positions.

9. The alignment determining method of claim 1 wherein said system is an automotive wheel alignment system, and said step of observing said optical target in at least two rotational positions includes mounting said optical target on a wheel adapter clamp secured to an automotive wheel.

10. The alignment determining method of claim 1 wherein utilizing said at least two determined orientations to calculate a compensation vector describing the alignment of said optical target relative to said rotational axis comprises the steps of:

calculating a first set of orientation parameters for said optical target at a first rotational position;

calculating a second set of orientation parameters for said optical target at a second rotational position; and calculating said compensation vector from said first and second set of orientation parameters.

11. The alignment determining method of claim 10 wherein said compensation vector is calculated relative to an optical target coordinate system.

12. In a system utilizing an observable optical target having a mounting shaft configured for insertion within an axial bore for rotation therein and an optical camera configured to observe the orientation of a face of said optical target, a method for computing alignment of said optical target face relative to said mounting shaft, comprising the steps of:

observing said face of said optical target in at least two rotational positions with said optical camera, said optical target releasably secured against rotation at each of said rotational positions;

calculating, for each of said rotational positions, a set of parameters describing the orientation of said target face; and computing a compensation vector describing the alignment of said target face relative to said mounting shaft utilizing said sets of calculated parameters.

13. The method of claim 12 further including the step of storing said compensation vector in association with said optical target for later use.

14. The method of claim 13 wherein storing said compensation vector in association with said optical target for later use comprises recording said compensation vector on said optical target.

15. The method of claim 13 wherein storing said compensation vector in association with said optical target for later use comprises recording said compensation vector in a database.

16. The method of claim 12 wherein said system is an automotive wheel alignment system, and said step of observing said optical target in at least two rotational positions includes mounting said optical target on a wheel adapter clamp secured to an automotive wheel.

17. In an automotive wheel alignment system having a wheel clamp adapted for attachment to a vehicle wheel, an optical target rotatably secured to said wheel clamp by means of a stub shaft inserted within an axial bore of said wheel clamp, and an optical camera configured to observe said optical target, a method for determining alignment of said optical target relative to said stub shaft, comprising the steps of:

attaching said wheel clamp to said vehicle wheel;

mounting said optical target on said wheel clamp such that said stub shaft seats within said axial bore;

observing said optical target in at least two rotational orientations about said stub shaft with said optical camera;

computing for each rotational orientation a set of parameters describing the orientation of said optical target at said rotational orientation; and determining an alignment of said optical target relative to said stub shaft utilizing said computed sets of parameters.

18. The method of claim 17 further including:

obtaining from said optical camera at least one image of said optical target at each said rotational orientation;

computing for each said rotational orientation a set of parameters describing the three dimensional orientation of said optical target at said rotational orientation from said at least one image corresponding to said rotational orientation; and determining a compensation vector describing the three dimensional orientation of said target relative to a longitudinal axis of said stub shaft from said sets of parameters.

19. The method of claim 18 wherein said optical target has a face, and said orientation of said optical target relative to said longitudinal axis of said stub shaft is expressed in a coordinate system relative to said optical target face.

20. The method of claim 17 further including the step of storing said determined alignment of said optical target in association with said optical target.

21. The method of claim 20 wherein storing said determined alignment of said optical target in association with said optical target comprises recording said determined optical target alignment on said optical target.

22. The method of claim 20 wherein storing said determined alignment of said optical target in association with said optical target comprises recording said determined optical target alignment in a database.

23. A method for using said determined alignment of said optical target stored in claim 20, comprising the steps of:

dismounting said optical target from said wheel clamp;

dismounting said wheel clamp from said vehicle wheel;

mounting a no compensation wheel clamp to a selected vehicle wheel such that an axial bore of said no compensation wheel clamp is aligned substantially parallel to the axis of rotation said selected vehicle wheel;

mounting said optical target on said no compensation wheel clamp such that said stub shaft seats within said axial bore of said no compensation wheel clamp and is aligned substantially parallel to said axis of rotation of said selected vehicle wheel;

observing said optical target with said optical camera to obtain an image of said target;

computing a set of parameters describing the orientation of said optical target from said image;

recalling said stored alignment of said optical target associated with said optical target; and determining the orientation of said axis of rotation of said selected vehicle wheel utilizing said recalled alignment of said optical target, said set of parameters describing the orientation of said target, and said substantially parallel relation between said stub shaft and said axis of rotation of said selected vehicle wheel.

24. The method of claim 23 wherein said no compensation wheel clamp is not the same wheel clamp which was dismounted from said vehicle wheel.

25. The method of claim 23 wherein said no compensation wheel clamp is the same wheel clamp which was dismounted from said vehicle wheel.

26. The method of claim 23 wherein said selected vehicle wheel is not the same vehicle wheel from which said wheel clamp was dismounted.

27. The method of claim 23 wherein said selected vehicle wheel is the same vehicle wheel from which said wheel clamp was dismounted.

28. The method of claim 23 wherein said optical target is mounted to said no compensation wheel clamp before said no compensation wheel clamp is mounted to said vehicle wheel.

29. The method of claim 23 wherein said optical target is dismounted from said wheel clamp after said wheel clamp is dismounted from said vehicle wheel.

30. A method for using said optical target face alignment stored in claim 20, comprising the steps of:

dismounting said optical target from said wheel clamp;

mounting said optical target on a selected wheel clamp attached to a selected vehicle wheel such that said axial bore of said wheel clamp is aligned substantially parallel to the axis of rotation of said selected vehicle wheel, said optical target mounted such that said stub shaft seats within said axial bore of said selected wheel clamp and is aligned substantially parallel to said axis of rotation of said selected vehicle wheel;

observing said optical target with said optical camera to obtain an alignment image of said optical target;

recalling said stored alignment of said optical target associated with said optical target; and determining the orientation of said axis of rotation of said selected vehicle wheel utilizing said recalled alignment of said optical target, said obtained alignment image, and said substantially parallel relation between said stub shaft and said axis of rotation of said selected vehicle wheel.

31. The method of claim 30 wherein said selected wheel clamp is not the same wheel clamp from which said optical target was dismounted.

32. A method for manufacturing at least one optical target for use in a vehicle wheel alignment system comprising:

forming a housing with a plurality of surfaces;

securing a planar optical target face to one of said surfaces;

securing a mounting shaft to a second of said surfaces, said mounting shaft having a longitudinal axis oriented with a fixed relationship to said planar optical target face; and storing, in association with each manufactured optical target, said fixed relationship between said mounting shaft longitudinal axis and said optical target face.

33. A method for using an optical target manufactured according to the method of claim 32 in a vehicle wheel alignment system having at least one wheel clamp secured to a vehicle wheel, comprising:

mounting said optical target on said wheel clamp such that said mounting shaft longitudinal axis is aligned substantially parallel to the axis of rotation of said vehicle wheel;

observing said optical target face at an orientation about said mounting means longitudinal axis; and determining the orientation of said axis of rotation of said vehicle wheel utilizing at least said observation of said optical target and said stored fixed relationship between said longitudinal axis of said mounting shaft and said optical target face.

34. A method for use with a vehicle wheel alignment system comprising a wheel clamp adapter configured for attachment to a vehicle wheel, an optical target having an optical target face and a mounting means arrayed at a known angular relationship to said optical target face and configured for attachment to said wheel clamp adapter, and an optical camera configured to observe said optical target, comprising:

attaching said wheel clamp adapter to said vehicle wheel in a known relationship to an axis of rotation of said vehicle wheel;

mounting said optical target to said wheel clamp adapter by said mounting means;

observing said optical target face with said optical camera to generate at least one image of said optical target face; and utilizing said known angular relationship between said mounting means and said optical target face, said known relationship of said wheel clamp adapter to said axis of rotation of said vehicle wheel, and said image of said optical target face observed by said optical camera to determine the orientation of said axis of rotation of said vehicle wheel.

35. The method of claim 34 wherein prior to mounting said optical target to said wheel clamp adapter, said known angular relationship between said mounting means and said optical target face is determined and stored in association with said optical target.

36. The method of claim 34 wherein said known angular relationship between said mounting means and said optical target face is determined subsequent to manufacture of said optical target.

37. A method for use with a vehicle wheel alignment system comprising a wheel clamp adapter configured for attachment to a vehicle wheel an optical target having an optical target face and a mounting means arrayed at a known angular relationship to said optical target face and configured for attachment to said wheel clamp adapter, and an optical camera configured to observe said optical target, comprising:

attaching said wheel clamp adapter to said vehicle wheel in a known relationship to an axis of rotation of said vehicle wheel;

mounting said optical target to said wheel clamp adapter by said mounting means;

observing said optical target face with said optical camera to generate at least one image of said optical target face:

utilizing said known angular relationship between said mounting means and said optical target face, and said image of said optical target face observed by said optical camera to determine the orientation of said axis of rotation of said vehicle wheel; and wherein said known angular relationship between said mounting means and said optical target face is calculated from a plurality of observations of said optical target face in a plurality of rotational positions about a longitudinal axis of said mounting means.

38. In a vehicle wheel alignment system utilizing at least one observable optical target having a mounting means with a rotational axis, a wheel clamp configured for attachment to a vehicle wheel, and an optical camera configured to observe said optical target for determining the orientation thereof, a method for using said optical target comprising the steps of:

observing said optical target in at least two rotational positions about said mounting means rotational axis with said optical camera;

determining an orientation of said optical target at each of said rotational positions;

computing the alignment of said optical target relative to said rotational axis utilizing said determined orientations; and utilizing said computed alignment to determine an alignment of said rotational axis of said vehicle wheel when said optical target is mounted on said wheel clamp attached to said vehicle wheel.

* * * * *